Jan. 25, 1955  R. H. HIEGER  2,700,432
LUBRICATING DEVICE FOR ENGINE DISTRIBUTORS
Filed Oct. 1, 1952
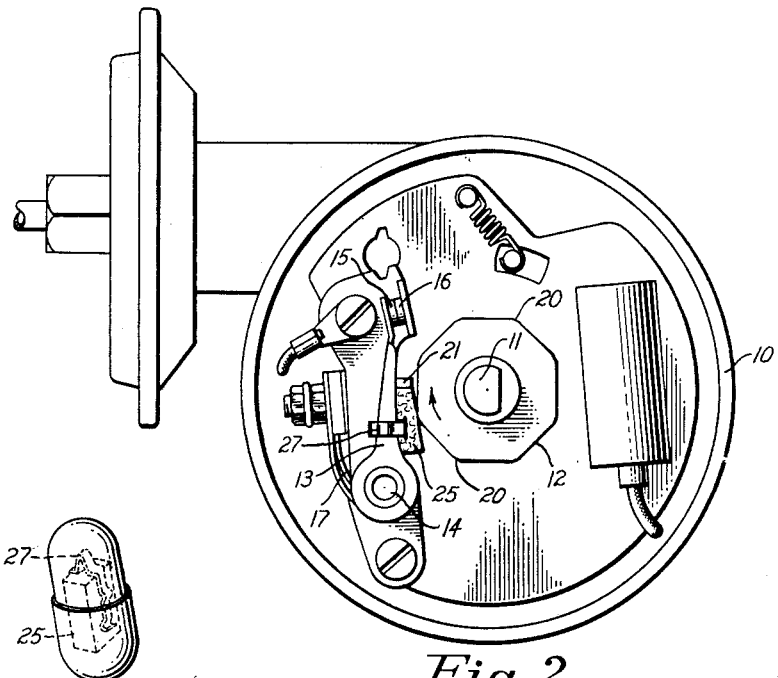
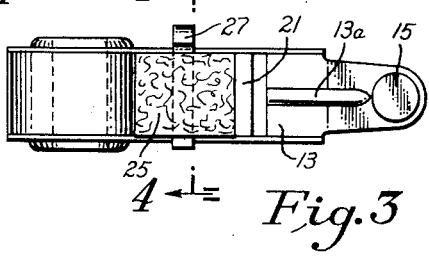
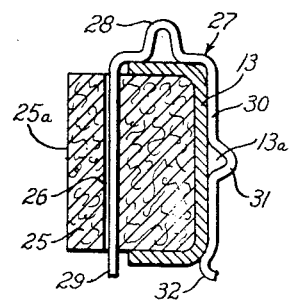
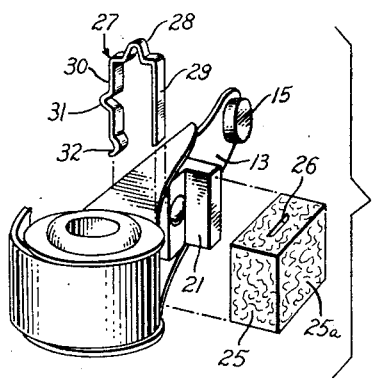
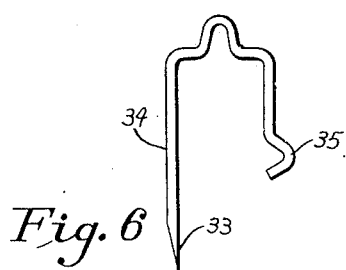
INVENTOR.
ROBERT H. HIEGER
BY
Gregory S. Dolgorukov
ATTORNEY.

United States Patent Office 2,700,432
Patented Jan. 25, 1955

2,700,432

LUBRICATING DEVICE FOR ENGINE DISTRIBUTORS

Robert Henry Hieger, Detroit, Mich.

Application October 1, 1952, Serial No. 312,544

9 Claims. (Cl. 184—102)

This invention relates to engine distributors and more particularly to an improved lubricating device therefor which can be installed on the original equipment or be distributed as a separate item of manufacture for installation on distributors of the cars already on the road.

It has been appreciated in the art that engine distributors require, for their proper operation and longer life, proper lubrication at the "sliding contact" surfaces between the cam of the distributor and the rubbing block carried by the arm making and breaking the primary electric circuit. It has been found, however, that usually when a garage mechanic lubricates a distributor he overloads it with grease or oil merely trying to do a good job and put in enough lubricant to last for a long time. As a result, some of the excessive lubricant is thrown by the action of the cam on the contact points. Presence of oil or grease at the contact points increases resistance thereof to the flow of primary current, particularly when oil is burned thereat by the action of the flash created when the contact points separate. This, in turn, affects adversely operation of the distributor, particularly by cutting down the spark and causing the engine to miss. Such new or resulting difficulty, unless located readily, results in faulty operation of the engine and may continue for a relatively long period of time. In many cases, particularly when such difficulty occurs, as is often the case, only 100–200 miles of driving after the distributor had been serviced, other parts of the engine are thought to be the cause of the difficulty, causing unnecessary changes of such parts as coils, sparkplugs, etc.

Attempts have been made to eliminate the above problem by using a special lubricant of increased viscosity, usually attained by addition of such substances as wax and/or soap, with the view that such dense grease would be less likely to be thrown in drops on contact points. It was found, however, that such an expedient adds more to the problem instead of solving it. Such special grease is usually applied from a tube (similar to a toothpaste tube) with a worm-shaped slug of grease squeezed out from the tube on the cam and the rubbing block. Since overloading of the distributor with the grease is not prevented by changing the viscosity of the grease, the more dense grease does not drain as readily as the more liquid lubricant and, in addition, because of its greater weight it is thrown by the action of the cam on the contact points still more readily.

It should also be appreciated that in addition to the fouling of the contact points the difficulties referred to above result in wearing out of the rubbing block and in changing spacing of the points. This, in turn, produces a two-fold difficulty: first, changing the dwell of the primary current making the ignition system less efficient due to the shorter dwell or the time of flow of the current into the coils; and second, changing the initial timing (since the wear of the cam tends to make the initial setting late), thereby producing erratic and inefficient operation of the engine. It has been found that such undesirable consequences often follow as soon as after 100–200 miles of driving after servicing of the distributor.

It is an object of the present invention to provide an improved lubricating device for engine distributors, particularly for the cams thereof, whereby the above difficulties and disadvantages are overcome and largely eliminated.

Another object of the present invention is to provide an improved lubricating device or unit for engine distributors, which device is pre-loaded with proper lubricant and is easily installed on a distributor arm in the field by a low skill mechanic, and which provides a source of fresh lubricant for the distributor cam for a sufficiently long period of time, such as 20,000–25,000 miles of driving, whereupon the device or unit can be just as easily removed and replaced by a new unit.

A still further object of the present invention is to provide an improved lubricating device for engine distributor, particularly the cam thereof, whereby applying lubricant of any kind in bulk directly to the distributor in garages and filling stations and the objectionable results thereof are completely eliminated.

A still further object of the present invention is to provide an improved lubricating device for engine distributor and particularly for the cam and rubbing block thereof, which device is adapted to hold and to apply to the cam and to the rubbing block a lubricant of proper character for such an application and without admixture of substances such as wax or soap formerly added to the lubricant merely to increase its viscosity with the hope of preventing such lubricant from getting on the contact points.

A further object of the present invention is to provide an improved lubricating device of the nature specified in the preceding paragraph, which device is not affected by impacts and vibrations incident to the operation of the distributor, but remains firmly and securely attached to the arm and does not shift or slide thereon.

A still further object of the present invention is to provide an improved lubricating device for engine distributors, particularly for the cams thereof, which device tends to tighten itself when its retaining means are moved in withdrawing direction by shocks or vibrations, and which thus tends to retain itself in a proper position.

A still further object of the present invention is to provide an improved lubricating device of the foregoing nature, which device is so constructed that shorting of the primary circuit controlled by the distributor is prevented.

It is an added object of the present invention to provide an improved lubricating device or unit of the nature specified above, which device is very simple in construction, dependable in operation, is very inexpensive to manufacture and is susceptible of being sold or distributed as a separate item of manufacture.

Further objects and advantages of this invention will be apparent from the following description and appended claims, reference being had to the accompanying drawings forming a part of this specification, wherein like reference characters designate corresponding parts in the several views.

Fig. 1 is a perspective view showing my distributor cam lubricating unit packed in a transparent capsule, i. e. in a form in which it may be distributed in the trade as a separate item of manufacture.

Fig. 2 is a plan view of an engine distributor, showing my improved lubricating unit installed on the breaker arm of the distributor.

Fig. 3 is a side view of the distributor breaker arm shown separately, with my unit being installed therein.

Fig. 4 is a sectional view taken in the direction of the arrows on the section plane passing through line 4—4 of Fig. 3.

Fig. 5 is an exploded view showing my improved distributor cam lubricating device or unit including a felt pad and a spring retaining clip, together with the breaker arm in which the same are to be installed.

Fig. 6 is a view of a spring clip of a modified construction, namely of a clip made of spring wire instead of a strip and having a needly point provided on the end of its straight leg, with the curved leg being made shorter.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention, I provide a detachable lubricating device preferably pre-loaded with proper lubricant in the process of its manufacturing and capable of being used for a period of time only, with a view of being discarded and replaced periodically in field. My improved device comprises, generally, a lubricant-holding pad and a resilient pad-retaining clip. This clip is designed to resist resiliently its removal, and it tends to remain always in a proper position, retaining the lubricating pad in place on the breaker arm. The pad is impregnated or saturated with a proper lubricant preferably during the manufacture of the device, and when installed in a distributor it provides proper lubrication therefor for 20,000 to 25,000 miles of driving. Such operation of the device is made possible by the fact that actually very little lubricant is necessary for the operation of the cam providing it is of a proper character and is properly applied to the cam. In this respect an engine distributor may be compared to a watch which will run properly for many years with one initial lubrication only, but which will stop functioning properly almost immediately if overloaded with lubricant of higher viscosity. My improved device operates to wipe constantly a thin film of proper oil over the surface of the cam without wasting the lubricant and without inviting the difficulties caused by over-lubricating of the cam, or using improper lubricant.

It can be easily appreciated that by virtue of such an expedient a lubricant of proper viscosity for its lubricating function and without admixture of substances such as wax and soap can be used in my improved device, ensuring proper lubrication of the distributor surfaces which are in sliding contact.

It is an important feature of the invention that if a metal clip is used, the same engages the pad in such a manner as to have no metal part thereof extend over or at the working surface of the pad, which part would present the danger of short circuiting the primary circuit. The lubricating pad with its retaining clip snapped on such pad may be packed in a transparent capsule and offered to the trade as a unit, thereby presenting a novel item of automobile parts business.

In the drawing there is shown, by way of example, an automobile distributor having a breaker arm on which there is installed a lubricating unit embodying the present invention. Referring specifically to the drawing, the distributor illustrated therein comprises a casing 10 in which there is operatively arranged, in a manner well known in the art, a shaft 11 carrying a rotary cam 12. The cam 12 cooperates with the breaker arm 13 having one end hinged as at 14, and its opposite end carrying a contact point 15. The contact point 15 cooperates in breaking and closing the primary circuit with another contact point 16 in a manner well known in the art. A leaf spring 17 is adapted to act on the arm 13 and to urge it in the direction of the contact point 16 and thus to maintain the contact points 15 and 16 in contact and thus to keep the primary ignition circuit closed, all in a manner well known in the art. Rotation of the cam 12 causes its high points or lobes 20 to contact successively a rubbing block 21 secured to the breaker arm in any suitable manner, such as by riveting its angle extension to the arm. The rubbing block is made of an insulating material and no current is intended to flow therethrough. The action of the cam lobes pressing on the rubbing block causes the breaker arm 13 to be moved to separate points 15 and 16, thus breaking the primary ignition circuit. The body of the breaker arm 13 is made of a channel cross section with a reinforcing rib 13a being provided on the bottom of the channel for rigidity.

The construction so far described is conventional, and no further description thereof is believed necessary for the purpose of understanding the present invention.

The lubricating device or unit comprises a pad 25 made of felt or other suitable lubricant-retaining material, the dimensions of which are selected to make said pad fit into the channel portion of the arm adjacent the rubbing block 21, as illustrated in the drawing. It is preferable to make the pad by cutting rectangular pieces out of a felt sheet or a strip, thus making a pad of a definite form adapted to fit tightly in the corner of the space provided for it. A recess or hole 26 is pierced in the pad 25 as shown in the drawing for passage of the straight leg of the pad-retaining clip, as explained below. The pad is saturated with proper lubricant, as stated above.

Means are provided to retain the felt pad 25 securely in place and to cause the same to be contacted by the cam lobes and thus to supply to said lobes the necessary lubrication. In the present embodiment of the invention said pad-retaining means are exemplified by spring clip, generally designated by the numeral 27. The clip 27 comprises a piece of spring material such as steel strip bent upon itself to form a closed end on which a curl 28 is provided for increasing resiliency, a straight leg 29, and a curved leg 30. The curved leg 30 has a bend or curl 31 provided on it to clear the reinforcing rib 13a provided on the arm, and an end bend or curl 32 provided at such a distance from the closed end of the clip that said leg 30 engages the breaker arm and partly embraces it at its ends, as is best shown in Fig. 4.

From an examination of Fig. 4 it will be seen that when the pad 25 is put in place and the straight leg 29 of the clip is passed through the recess 26 with the leg 29 placed over the arm, said leg 29 snaps in place with the curl 31 snapping over the reinforcing rib 13a and the curl 32 snapping over the edge of the arm 13. The pad 25 is thus securely kept in position without any metal portions or parts of the clip 27 extending at the working surface 25a of the pad 25, thereby preventing the danger of short circuiting. Moreover, the leg 29 retains itself resiliently in place, and any tendency of the clip 27 to move upward is resisted by the resiliency thereof, since for such movement the leg 29 has to bend away to pass over the rib 13a and to clear the edge of the channel. Thus, the clip maintains itself in place and, in turn, maintains the pad 25 in its operative position.

It will be seen from an examination of the drawing that in its installed position the pad 25 abuts against the rubbing block 21 and is thus positively retained from movements toward the contact points by said rubbing block, and from sidewise movements by the walls of the channel. Movement of the block away from the arm is prevented by the clip 27, while the movements of the pad along the arm toward the hinge thereof is resisted by the curved shape of the arm. Presence of the recess 26 in the pad 25 ensures its proper mounting and location on the arm.

Fig. 6 illustrates a modified construction of the retainer clip. The clip shown in said Fig. 6 is substantially similar to that shown in Figs. 1–5 but is made of spring wire and is provided with a needle point 33 on the end of its straight leg 34. By virtue of such a construction prepunching of the hole or recess, such as recess 26 in the block 25, may be eliminated. The curved leg 35 of the clip may be made shorter, as illustrated, if the clip is to be used with ribbed arms only.

There is thus provided an improved lubricating unit for automobile engine distributors, whereby the objects of the present invention listed above and numerous additional advantages are attained.

I claim:

1. In an engine distributor having a rotary cam and a breaker arm of channel cross section and a rubbing block provided on said arm and adapted to be in sliding contact with said cam at predetermined periods of the rotative cycle thereof; a lubricating pad made of material adapted to retain its shape, said pad being presaturated with lubricant and arranged on said arm to fit into the channel thereof and to be contacted by the cam, and a spring clip retaining said pad removably in place and arranged inwardly of the lubricating surface of the pad.

2. In an engine distributor including a rotary cam and a breaker arm having a rubbing block adapted to be in sliding contact with said cam at predetermined periods of the rotative cycle thereof; a lubricating felt pad presaturated with lubricant and arranged on said arm against said rubbing block to be contacted by the cam, and a slip-on spring clip arranged inwardly of the lubricating surface of the pad and retaining said pad removably in place, removal of the clip being effected merely by pulling thereon.

3. In an engine distributor including a rotary cam and a breaker arm having a middle portion with a channel cross section and a rubbing block provided on said arm and adapted to be in sliding contact with said cam at predetermined periods of the rotative cycle thereof; a lubricating felt pad presaturated with lubricant and arranged on said arm to fit into the channel portion of the cam and abut directly against said rubbing block and to be contacted by the cam, and a slip-on spring clip having one closed end and one open end for slipping over the arm and through the pad for retaining the latter removably in place on the arm.

4. In an engine distributor including a rotary cam and a breaker arm having a rubbing block adapted to be in sliding contact with said cam at predetermined periods of the rotative cycle thereof; a lubricating felt pad substantially co-extensive with the width of the arm and impregnated with lubricant and arranged on said arm to be contacted by the cam, with the movement of the cam tending to press the pad against the rubbing block, and a slip-on spring clip retaining said pad removably in place, said clip comprising an elongated piece of spring material bent upon itself to form a closed end and two legs extending therefrom, one of said legs being adapted to engage said arm and the other leg being adapted to engage said pad inwardly of the lubricating surface thereof.

5. A lubricating unit for an engine distributor having a rotary cam and a breaker arm with a rubbing block adapted to be in sliding contact with said cam at predetermined periods of the rotative cycle thereof; said unit comprising a lubricating felt pad adapted to be arranged on said arm to be contacted by the cam, and a slip-on spring clip adapted to retain said pad removably in place, said clip comprising a strip of spring material bent upon itself to form two legs, one of said legs being adapted to engage said arm and the other leg being adapted to be passed through the mass of said pad substantially at the middle thereof and thus to retain the pad in place at said arm and to be separated from the cam by a substantial portion of the pad mass.

6. A lubricating unit for an engine distributor having a rotary cam and at least one breaker arm having a rubbing block adapted to be in sliding contact with said cam at predetermined periods of the rotative cycle thereof; said unit comprising a lubricating pad arranged on said arm at said rubbing block to be contacted by the cam, and a slip-on spring clip adapted to retain said pad removably in place, said clip comprising a piece of spring material bent upon itself to form a closed end and two legs extending therefrom, one of said legs being formed to engage one side of the arm and to embrace the same partly at least at the bottom thereof, the second of said arms being adapted to be passed into the mass of said pad to retain the same in place on said arm.

7. A lubricating unit for an engine distributor having a rotary cam and a breaker arm having a middle portion of a channel cross section with a rubbing block arranged within said channel portion for being contacted by said cam at predetermined periods of its rotative cycle; said unit comprising a felt pad adapted to be soaked with and to retain a lubricant, said pad being adapted to fit into the channel portion of the arm and abut directly against said rubbing block, and a slip-on clip adapted to retain said pad removably in place.

8. The construction defined in claim 7, with the pad having a hole formed therein and the clip engaging said pad being adapted to be passed through said hole and thus to be electrically insulated by the mass of the pad from the cam.

9. A lubricating unit for an engine distributor having a rotary cam and a breaker arm having a rubbing block adapted to be in sliding contact with said cam at predetermined periods of the rotative cycle thereof; said unit comprising a lubricating felt pad arranged on said arm to be contacted by the cam, and a slip-on clip adapted to retain said pad removably in place, said clip comprising a piece of spring material bent upon itself to form a closed end and two legs, one of said legs being formed to engage one side of the arm and to embrace the same partly at least at the bottom thereof, the second of said arms being straight and adapted to be passed into the mass of said pad to retain the same in place on said arm, and a curl formed on said closed end to increase the resiliency thereof and enable further opening of the clip without straining it at its closed end beyond the elastic limit.

References Cited in the file of this patent

UNITED STATES PATENTS

| | | |
|---|---|---|
| 1,293,193 | Poyas | Feb. 4, 1919 |
| 2,007,217 | Rose | July 9, 1935 |
| 2,034,683 | Olandt | Mar. 17, 1936 |
| 2,635,150 | Spang | Apr. 14, 1953 |